United States Patent
Wild et al.

(10) Patent No.: US 6,546,971 B1
(45) Date of Patent: Apr. 15, 2003

(54) APPARATUS FOR INSERTING BAGS INTO AN OUTER CONTAINER

(75) Inventors: Hans-Peter Wild, Zug (CH); Eberhard Kraft, Neckarbischofsheim (DE)

(73) Assignee: Indag Gesellschaft fur Industriebedarf mbH & Co. Betriebs KG, Heidelberg (DE)

( * ) Notice: Subject to any disclaimer, the term of this patent is extended or adjusted under 35 U.S.C. 154(b) by 0 days.

(21) Appl. No.: 09/690,365

(22) Filed: Oct. 17, 2000

(30) Foreign Application Priority Data

Oct. 28, 1999 (DE) .......................... 199 52 009

(51) Int. Cl.⁷ .............................. B65B 43/42
(52) U.S. Cl. .................. 141/145; 141/129; 141/170; 198/436
(58) Field of Search ................. 141/145, 129, 141/144, 313, 314, 315, 316, 114, 170, 171, 10; 53/237, 240, 244, 246, 251, 458, 473, 202, 284.5; 198/459.2, 450, 441, 457.07, 624, 478.1, 481.1, 418.2, 436, 370.07

(56) References Cited

U.S. PATENT DOCUMENTS

| | | | |
|---|---|---|---|
| 2,908,125 A | * 10/1959 | Jarund | |
| 3,041,805 A | 7/1962 | Fulco | |
| 3,191,748 A | * 6/1965 | Martin | |
| 4,043,095 A | * 8/1977 | Graser | |
| 4,149,355 A | * 4/1979 | Clegg | 53/240 |
| 4,321,994 A | * 3/1982 | Heuft | 198/436 |
| 4,433,526 A | * 2/1984 | Nord | 53/244 |
| 4,776,148 A | 10/1988 | Mingozzi | |
| 4,974,717 A | * 12/1990 | Weichhand | |
| 5,135,101 A | * 8/1992 | Dudley | 198/370.07 |
| 5,388,682 A | * 2/1995 | Dudley | 198/370.07 |
| 5,423,410 A | * 6/1995 | Keller et al. | |
| 6,067,772 A | 5/2000 | Kraft et al. | |
| 6,257,820 B1 | * 7/2001 | Veltman | |

FOREIGN PATENT DOCUMENTS

| | | |
|---|---|---|
| CH | 556767 | 10/1974 |
| DE | 1903293 | 7/1970 |
| DE | 2335026 | 1/1975 |
| DE | 39 21 538 | 3/1991 |
| DE | 197 45 854 | 8/1998 |
| EP | 0 551 613 | 12/1992 |
| EP | 0 696 538 | 6/1995 |
| GB | 1435402 | * 5/1976 |

* cited by examiner

Primary Examiner—Steven O. Douglas
Assistant Examiner—Khoa Huynh
(74) Attorney, Agent, or Firm—Marshall, Gerstein & Borun

(57) ABSTRACT

Apparatus for inserting a plurality of bags, in particular stand up bags filled with a beverage, into an outer container, including a bag conveyor and a feed conveyor for the container, the bags being insertable into the container under the action of gravity at an insertion point positioned above the feed conveyor. For further improving such an apparatus and for increasing the conveying speed, the bag conveyor can comprise a star conveyor which is rotatable about a substantially horizontal axis and which is provided with receiving compartments that can be loaded and unloaded on the circumference and which receive only a single bag in the conveying direction, and which has the same conveying direction as the feed conveyor above the feed conveyor at the insertion point.

7 Claims, 2 Drawing Sheets

APPARATUS FOR INSERTING BAGS INTO AN OUTER CONTAINER

FIELD OF THE INVENTION

The present invention relates to an apparatus for inserting bags into an outer packaging or container.

BACKGROUND OF THE INVENTION

Such an apparatus is shown in DE 197 45 854 C1. The known apparatus contains an endless circular conveyor for the bags and a feed conveyor designed as a linear conveyor for the outer container, which is arranged below the circular conveyor and crosses the conveying direction of the circular conveyor at two diametrically opposed insertion points. The circular conveyor comprises a plurality of receiving compartments that extend in a direction transverse to the conveying direction and are configured to receive a plurality of bags. Bags are supplied in a continuous flow and are periodically conveyed into the receiving compartments in an upright position, whereby the circular conveyor can only be operated periodically. At the first crossing point of the conveying directions of circular conveyor and feed conveyor, every second receiving chamber is unloaded into the container, whereas the still loaded receiving compartments are further transported to the second unloading point at the second crossing point between the conveying directions of the circular conveyor and the feed conveyor. Since such bags, e.g. beverage bags with a self-standing bottom, must be mass-produced and packed, even the slightest delays in the transportation speed will affect their economy. It has been found that the known apparatus can still be optimized to a further degree.

SUMMARY OF THE INVENTION

It is thus the object of the present invention to provide an apparatus for inserting a plurality of bags into an outer container, the apparatus being further optimized with respect to the conveying speed.

Thanks to the use of a star conveyor according to the invention, the conveying rate of the bags and subsequently the conveying rate of the outer container to be filled with bags is continuously maintained, i.e. a periodic transportation is no longer required. The delays associated therewith are thus avoided, which will further increase the conveying speed. Although a continuous transportation of bags into an outer container is already described in EP 696 538 B1, use is there made of a linear conveyor having an upper belt and a lower belt, which retains the bags at two sides on their way to the outer container. Moreover, in the known apparatus the bags must be arranged in an imbricated manner before being inserted into the container. Both measures, however, are only suited for bags having a substantially regular configuration. Stand up bags as should preferably be processed with the apparatus of the invention converge, however, from their broad self-standing bottom towards the opposite edge at an acute angle, so that they can be conveyed neither with an upper belt nor a lower belt nor in an imbricated manner.

Thanks to the inventive use of a star conveyor which comprises receiving compartments and rotates about a horizontal axis and can be loaded and unloaded on the circumference, even irregularly shaped bags can be fed at a uniform rate to the container.

BRIEF DESCRIPTION OF THE DRAWINGS

An embodiment of the invention shall now be explained in more detail with reference to the drawings, in which.

BRIEF DESCRIPTION OF THE PREFERRED EMBODIMENT

Figure 1:
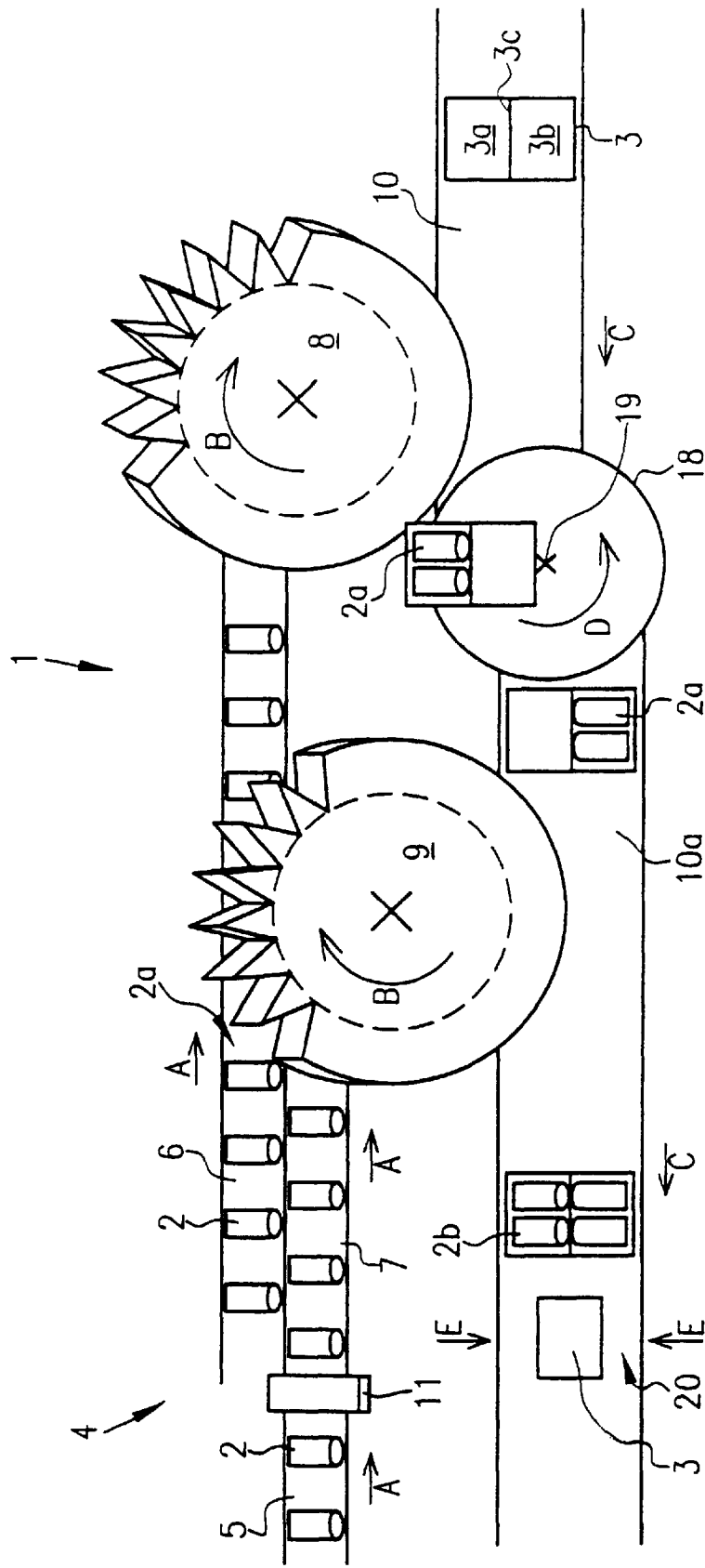
FIG. 1 is a schematic perspective view illustrating the apparatus of the invention.

FIG. 1 shows an apparatus according to the invention for inserting a plurality of bags 2 into an outer packaging or container 3. The bags 2 are stand up bags made from film or foil material and have a self-standing bottom at one side and a weld closing the filling opening at the opposite side, as well as a cushion-curved circumference at the remaining sides as are standard for packing beverages. The bags 2 are filled, closed and optionally provided with a drinking straw in the customary manner (not shown).

The outer container 3 is one of the standard foldable containers having a first compartment 3a for receiving a first set 2a of bags 2 and a second compartment 3b for receiving a second set of bags 2b, as well as a bending fold 3c around which the two compartments 3a and 3b can be folded for forming an outer container 3 which is closed on all sides (FIG. 1, left side, bottom).

The apparatus 1 contains a bag conveyor 4 having a supply conveyor 5 and two partial conveyors 6 and 7 for conveying lying bags 2, two star conveyors 8 and 9, with each partial conveyor 6 and 7 being assigned to a star wheel 8 and 9, respectively, as well as a feed conveyor 10 for the containers 3.

The supply conveyor 5 conveys a continuous row of bags 2 arranged in the same orientation (self-standing bottom to the right in FIG. 1), and lying on the supply conveyor 5, namely in the direction of arrow A towards a distributing means 11, such as a slide or the like, which transfers each second bag 2 to the first partial conveyor 6 while maintaining the orientation of said bag, and leaves the remaining bags on the second partial conveyor 7. The second partial conveyor 7 is either an extension of the supply conveyor 5 or a separate conveyor belt. Both partial conveyors 6 and 7 move on in the direction of arrow A to their respectively associated star conveyors 8 and 9 which are arranged in staggered fashion in the direction of arrow A.

Figure 2:
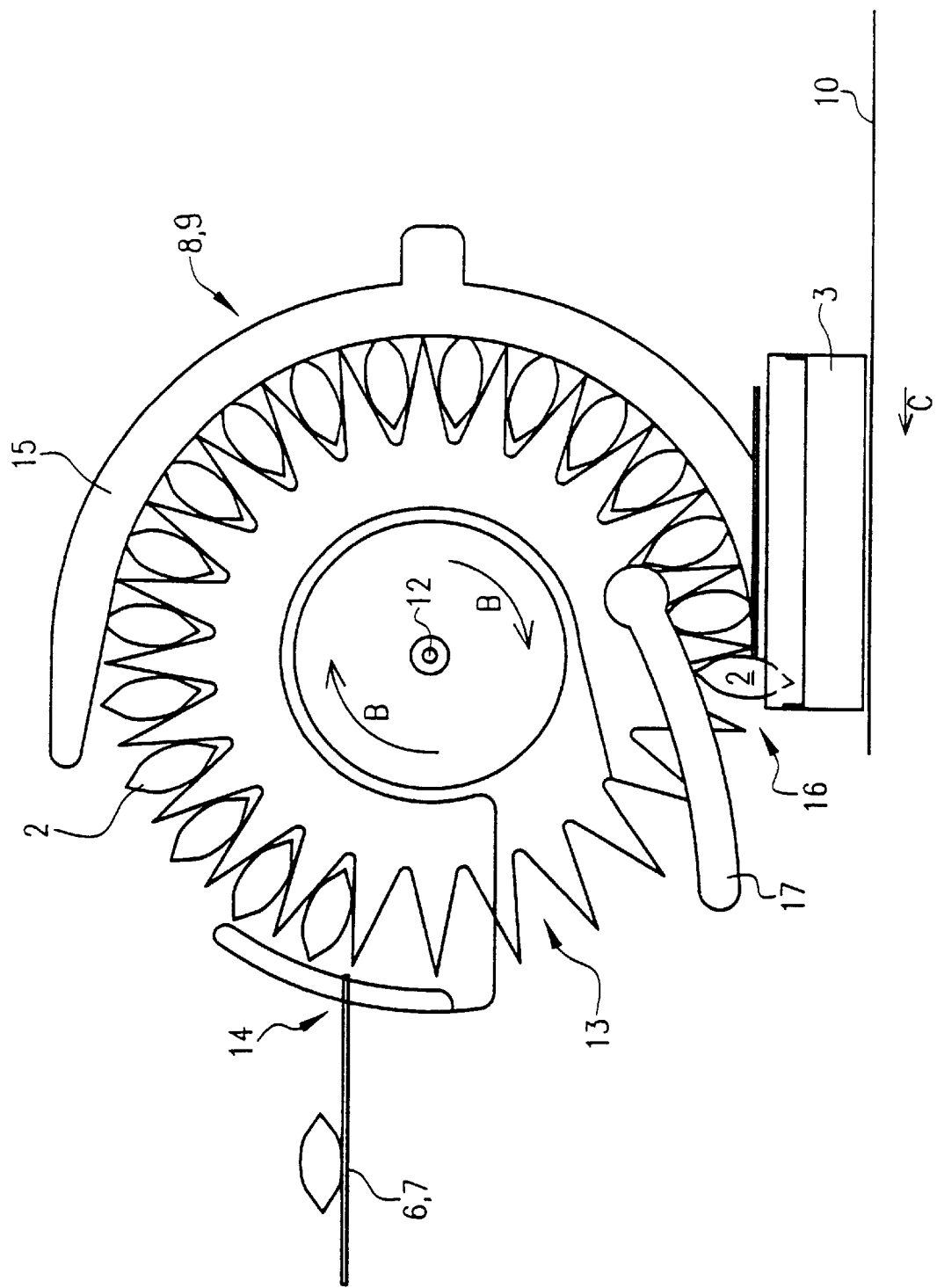
FIG. 2 is a schematic side view of a star conveyor.

As shown in FIG. 2, each star conveyor 8, 9 is supported to rotate in direction B about a horizontal axis 12 extending in a direction transverse to the conveying direction A. Each star conveyor is provided on its circumference with a multitude of receiving compartments 13 which are positioned one after the other in direction B and formed by partition walls having a substantially triangular cross-section, the compartments 13 being dimensioned in direction B such that they can only receive a single bag in the conveying direction. In the direction of axis 12, however, the compartments can readily be dimensioned such that they are able to receive two or even more bags at the same time; in such a case a corresponding number of partial conveyors or a partial conveyor of a suitable width must then be provided. The partial conveyors 6, 7 which are designed as conveyor belts hit against the star conveyors 8, 9 at a loading point 14 which is at least at the same level as axis 12, but preferably positioned at a slightly higher level. The rotational speed of the star conveyors 8, 9 is adapted to the conveying speed of the partial conveyors 6, 7 such that each compartment 13 running past the loading point 14 is loaded with a respective bag, the bag being pushed by the partial conveyor 6, 7 into the respective compartment 13 whereby the partial conveyors are emptied. The filled receiving compartments 13 first move in direction B upwards and then downwards; while moving they are guided past a stationary cover 15 which covers the compartments such that the bags which are only loosely lying within the compartments 13 cannot fall out prematurely. Near or at the lowest conveying point of the star conveyors 8, 9, the cover 15 ends or has a gap, thereby forming an insertion point 16 at which the bags 2 fall into the container 3 which has been pushed by the feed conveyor 10 below the star conveyor 8, 9. The container 3 moves in conveying direction C to the insertion point 16 in the same sense, and at an adjusted speed, as the bag 2 in conveying direction B, so that bags 2 can tightly be packed into the corresponding compartments 3a, 3b. The release of bags 2 from the receiving compartments 13 at an optimum time is supported by an unloading guide 17 which the bags 2 abut on and which directs the bags 2 into container 3.

As can be seen in FIG. 1, a first set 2a of bags are first introduced by the star conveyor 8 into the first compartment 3a of the container 3 supplied on the feed conveyor 10, the bags of said first set originating from the row of bags 2 positioned on the first partial conveyor 6. After insertion the feed conveyor 10 moves the half-filled container 3 to a rotating means 18, such as a turntable, which is rotatable in the direction of arrow D about a vertical axis 19. The rotating means 18 rotates the half-filled container 3 about the vertical axis 19 by 180°, thus transferring the container 3 rotated in this way to a second portion 10a of the feed conveyor 10 which is now feeding the half-filled container 3 to the insertion point 16 at the second star conveyor 9 such that the second set 2b of bags originating from the row of bags supplied on the second partial conveyor 7 can be introduced into the second compartment 3b of the container. Due to the rotation on the rotating means the two sets 2a, 2b in the container 3 have opposite orientations, the self-standing bottoms preferably facing the fold 3c, although the bags have been delivered with an identical orientation. After the second set 2b has been introduced into the container 3, the filled container leaves the area of the star conveyor 9 and passes into a standard folding means 20, which is just represented by the forces required for folding the container 3, and leaves apparatus 1, optionally after an additional step for fastening the two compartments to each other.

In a modification of the described and illustrated embodiment, the apparatus of the invention may also be used for packing bags from a single row into a single set or, by omission of the rotating means, for packing two identically oriented sets of bags. The partition walls of the receiving compartments of the star conveyors may have tips which in the conveying direction are slightly bent forwards. Although the apparatus of the invention develops its special advantages in handling stand up bags of foil or film material with different thicknesses at the two ends thereof, symmetrically shaped bags can also be handled easily. With these bags, too, the continuous conveying rate which is not interrupted by a periodic advance movement achieves an acceleration of the whole conveying operation.

We claim:

1. An apparatus for inserting a plurality of bags into an outer container, comprising in combination a bag conveyor, a feed conveyor for the container, said bag conveyor comprising a star conveyor which is rotatably driven about a substantially horizontal axis to define a conveying direction, a circumferential portion of said star conveyor being provided with a plurality of equally spaced receiving compartments about an entire circumference of said star conveyor, each of the compartments being loadable at a loading point with a single bag in the conveying direction and the loading point being between a location at least as high as the horizontal axis and an apex of the star conveyor and at a position where the compartments are moving upwards, with the bags settling to a substantially uniform orientation in their respective compartments by gravity while the compartments travel from the loading location to the apex of the star conveyor, and each of the compartments being unloadable at an unloading location spaced in the conveying direction from a location at which each said compartment was loaded with a single bag, for transferring each bag into the container carried by the feed conveyor, the unloading location being arranged above the feed conveyor, the feed conveyor being driven to define a conveying direction thereof which is parallel to the conveying direction of the star conveyor at the unloading location to allow the bag to fall out of the compartment and into the container by gravity, said bag conveyor including a first partial conveyor and a first star conveyor for bags of a first set, and a second partial conveyor and a second star conveyor for bags of a second set, and the feed conveyor for the container communicating with both said star conveyors, wherein said bag conveyor includes a supply path for supplying a continuous row of bags and a slide for distributing the bags among said first partial conveyor and said second partial conveyor.

2. An apparatus for inserting a plurality of bags into an outer container, comprising in combination a bag conveyor, a feed conveyor for the container, said bag conveyor comprising a star conveyor which is rotatably driven about a substantially horizontal axis to define a conveying direction, a circumferential portion of said star conveyor being provided with a plurality of equally spaced receiving compartments about an entire circumference of said star conveyor, each of the compartments being loadable at a loading point with a single bag in the conveying direction, and each of the compartments being unloadable at an unloading location spaced in the conveying direction from a location at which each said compartment was loaded with a single bag, for transferring each bag into the container carried by the feed conveyor, the unloading location being arranged above the feed conveyor, the feed conveyor being driven to define a conveying direction thereof which is parallel to the conveying direction of the star conveyor at the unloading location to allow the bag to fall out of the compartment and into the container by gravity, said bag conveyor including a first partial conveyor and a first star conveyor for bags of a first set, and a second partial conveyor and a second star conveyor for bags of a second set, and the feed conveyor for the container communicating with both said star conveyors, wherein said bag conveyor includes a supply path for supplying a continuous row of bags and a distributing means for distributing the bags among said first partial conveyor and said second partial conveyor, said star conveyor having a rotational axis, and wherein bags loaded at said loading point are lifted upwardly before being transferred downwardly to the unloading location and such lifting facilitating the bags uniformly settling in the respective compartments prior to unloading.

3. The apparatus according to claim 1, said star conveyor having a rotational axis, and wherein the loading point is located on a side of the apex of the star conveyor opposite the location of the unloading location of the star conveyor, whereby bags loaded at said loading point are lifted upwardly before moving downwards to the unloading location.

4. The apparatus according to claim 1 or 2, wherein said second star conveyor is arranged in a conveying direction of said feed conveyor behind said first star conveyor.

5. An apparatus for inserting a plurality of bags into an outer container, comprising in combination a bag conveyor, a feed conveyor for the container, said bag conveyor comprising a star conveyor which is rotatably driven about a substantially horizontal axis to define a conveying direction, a circumferential portion of said star conveyor being provided with a plurality of equally spaced receiving compartments about an entire circumference of said star conveyor, each of the compartments being loadable at a loading point with a single bag in the conveying direction and the loading point being between a location at least as high as the horizontal axis and an apex of the star conveyor and at a position where the compartments are moving upwardly, with the bags settling to a substantially uniform orientation in their respective compartments by gravity while the compartments travel from the loading location to the apex of the star conveyor, and each of the compartments being unloadable at an unloading location spaced in the conveying direction from a location at which each said compartment was loaded with a single bag, for transferring each bag into the container carried by the feed conveyor, the unloading location being arranged above the feed conveyor, the feed conveyor being driven to define a conveying direction thereof which is parallel to the conveying direction of the star conveyor at the unloading location to allow the bag to fall out of the compartment and into the container by gravity, said bag conveyor including a first partial conveyor and a first star conveyor for bags of a first set, and a second partial conveyor and a second star conveyor for bags of a second set, the feed conveyor for the container communicating with both said star conveyors, wherein said bag conveyor includes a supply path for supplying a continuous row of bags and a slide for distributing the bags among said first partial conveyor and said second partial conveyor, and further comprising a stationary cover oriented adjacent the star conveyor between the loading point and the unloading location to prevent bags received in the compartments from falling out of the compartments prematurely.

6. An apparatus for inserting a plurality of bags into an outer container, comprising in combination a bag conveyor, a feed conveyor for the container, said bag conveyor comprising a star conveyor which is rotatably driven about a substantially horizontal axis to define a conveying direction, a circumferential portion of said star conveyor being provided with a plurality of equally spaced receiving compartments about an entire circumference of said star conveyor, each of the compartments being loadable at a loading point with a single bag in the conveying direction, and each of the compartments being unloadable at an unloading location spaced in the conveying direction from a location at which each said compartment was loaded with a single bag, for transferring each bag into the container carried by the feed conveyor, the unloading location being arranged above the feed conveyor, the feed conveyor being driven to define a conveying direction thereof which is parallel to the conveying direction of the star conveyor at the unloading location to allow the bag to fall out of the compartment and into the container by gravity, said bag conveyor including a first partial conveyor and a first star conveyor for bags of a first set, and a second partial conveyor and a second star conveyor for bags of a second set, and the feed conveyor for the container communicating with both said star conveyors, wherein said bag conveyor includes a supply path for supplying a continuous row of bags and a distributing means for distributing the bags among said first partial conveyor and said second partial conveyor, said star conveyor having a rotational axis, a stationary cover oriented adjacent the star conveyor between the loading point and the unloading location to prevent bags received in the compartments from falling out of the compartments prematurely and said loading point located between a height no lower than a common horizontal plane with the rotational axis of the star conveyor and a height lower than an apex of the star conveyor, and wherein bags loaded at said loading point are lifted upwardly before being transferred downwardly to the unloading location and such lifting facilitating the bags uniformly settling in the respective compartments prior to unloading.

7. The apparatus according to claim 5 or 6, wherein said star conveyor is arranged in a conveying direction of said feed conveyor behind said first star conveyor.

* * * * *